United States Patent [19]

Dekkers et al.

[11] Patent Number: 5,356,955
[45] Date of Patent: Oct. 18, 1994

[54] ARTIFICIAL POLYMER LATICES IN CORE-SHELL FORM AND METHOD OF PREPARATION

[75] Inventors: Marinus E. J. Dekkers, Schenectady, N.Y.; Mary E. Adams, Beauvais, France

[73] Assignee: General Electric Company, Schenectady, N.Y.

[21] Appl. No.: 980,444

[22] Filed: Nov. 23, 1992

Related U.S. Application Data

[63] Continuation of Ser. No. 773,800, Oct. 9, 1991, abandoned.

[51] Int. Cl.$^5$ .................. C08F 265/08; C08F 257/02; C08F 255/04; C08F 255/06
[52] U.S. Cl. .................................. 523/201; 524/501; 524/504; 525/87; 525/315; 525/316; 525/323; 525/902
[58] Field of Search ................ 523/201; 524/501, 504; 525/315, 316, 323, 902, 87

[56] References Cited

U.S. PATENT DOCUMENTS

| | | | |
|---|---|---|---|
| 2,802,809 | 8/1957 | Hayes | 525/83 |
| 3,671,607 | 6/1972 | Yoon Lee | 525/902 |
| 4,299,931 | 11/1981 | Coran et al. | 523/315 |
| 4,539,375 | 9/1985 | Dunkelberger | 525/323 |
| 4,742,108 | 5/1988 | Makati et al. | 524/458 |
| 5,187,221 | 2/1993 | Schlüter et al. | 523/201 |

FOREIGN PATENT DOCUMENTS 2046767  11/1980  United Kingdom ............... 524/504

*Primary Examiner*—Paul R. Michl
*Assistant Examiner*—Andrew E. C. Merriam
*Attorney, Agent, or Firm*—William H. Pittman

[57] ABSTRACT

Stable aqueous artificial latices having a core-shell structure are prepared from two otherwise incompatible polymers in a blend also including a copolymer of said polymers. For example, an artificial latex in which the particles have a styrene-acrylonitrile core and an EPDM shell can be prepared.

10 Claims, No Drawings

ARTIFICIAL POLYMER LATICES IN CORE-SHELL FORM AND METHOD OF PREPARATION

This application is a continuation of application Ser. No. 07/773,800, filed Oct. 9, 1991 now abandoned.

This invention relates to the preparation of artificial aqueous polymer latices, and more particularly to mixed latices of novel morphology prepared from normally incompatible polymers.

The preparation of polymer latices (i.e., stable aqueous polymer emulsions) from ethylenically unsaturated monomers by emulsion polymerization techniques is well known. Typical latices which may be prepared in this way are polybutadiene, polystyrene, poly(styrene-acrylonitrile) and poly(methyl methacrylate) latices.

However, many polymers are difficult or even impossible to prepare in aqueous emulsion for various reasons. Included among these are condensation polymers, various olefin polymers such as polyethylene, polypropylene and ethylene-propylene copolymers, and copolymers of one or more olefins with other monomers such as non-conjugated dienes. The latter are illustrated by terpolymers of ethylene, propylene and non-conjugated dienes, hereinafter designated "EPDM" polymers.

To obtain in latex form polymers which cannot be prepared in emulsion, it is necessary to employ artificial latex techniques. Illustrative of such techniques are the solvent emulsification methods in which a solution of the already prepared polymer in a volatile, water-immiscible solvent is dispersed in water in the presence of emulsifiers, after which the solvent is removed by evaporation or distillation. This technique is commonly used, for example, to prepare latices of EPDM polymers.

EPDM polymers are particularly valuable for use in environments where weatherability is an important property, since they are very resistant to adverse weather conditions. It would be desirable for various purposes to prepare mixed latices of EPDM polymers with other polymers such as polystyrene, acrylic polymers and mixed styrene-acrylic polymers. The preparation of latices of these types is, however, complicated by the fact that EPDM polymers and polystyrene or acrylic copolymers are normally incompatible. Latices of the two typically comprise individual polymer particles with essentially no interaction between them or, at best, particles comprising hemispherical fragments of each of the two polymers with a high degree of interfacial tension.

This morphology has been confirmed by transmission electron microscopy (hereinafter "TEM") techniques. In such techniques, a small amount of the aqueous latex is diluted with water, an aqueous uranyl acetate solution is added and the sample is examined by cold stage TEM after withdrawal of excess liquid. To make the particle morphology more observable, further staining with ruthenium tetroxide vapor is frequently performed, whereupon the polystyrene or acrylic phase appears darker than the EPDM phase.

The problem of incompatibility between EPDM polymers and styrene or acrylic polymers can be solved for some purposes by grafting styrene, acrylic monomers or a mixture thereof on preformed EPDM particles. The result is a polymer of core-shell configuration with the EPDM forming the core and the styrene and/or acrylic polymer forming the shell. Under certain circumstances, however, it would be desirable to reverse this morphology and create a polymer with a styrene and/or acrylic core and an EPDM shell. This has not previously been attainable due to the incompatibility of the two polymers.

The present invention provides a method for preparing copolymer-containing compositions of core-shell morphology in aqueous latex form, from previously formed polymers which are normally incompatible. This may be done by relatively simple artificial latex techniques. Also provided are core-shell copolymer compositions in which the core comprises alkenylaromatic and/or acrylic copolymers and the shell comprises an olefin polymer or copolymer, illustrated by EPDM polymers. Said core-shell copolymer latex compositions have high stability as a result of a novel compatibilization scheme.

In one of its aspects, the invention is a method for preparing a composition comprising an artificial aqueous copolymer latex in core-shell form of two otherwise incompatible polymers which comprises forming an aqueous latex from said polymers in the presence of an effective amount of at least one emulsifier therefor and of a compatibilizing amount of a copolymer of said polymers.

The polymers from which aqueous latices are prepared according to the method of this invention are not particularly limited in nature; most often, however, they are polymers of ethylenically unsaturated monomers including polymerizable monoolefinic and diolefinc compounds. The only requirement is that the polymers be normally incompatible when prepared in latex form; that is, that the particles of the different polymers in the latex be ordinarily separate or combined particles in hemispherical form, with a higher degree of interfacial tension between them than between each polymer and the water forming the continuous phase of the latex. Illustrative polymers of this type are, on the one hand, polymers of aliphatic olefins such as ethylene, propylene, 1-butene, 1-hexene, 1-octene and isobutene, optionally in combination with non-conjugated dienes such as 5-ethylidene-2-norbornene, vinylnorbornene, norbornadiene, dicyclopentadiene or 1,6-hexadiene (i.e., EPDM polymers of conventional type); and, on the other hand, polymers of at least one of alkenylaromatic monomers such as styrene and acrylic monomers (i.e., acrylic and methacrylic acids and compounds of similar structure as well as derivatives thereof, typically esters and nitriles). The invention is particularly applicable to EPDM polymers in combination with combined alkenylaromatic and/or acrylic polymers, especially styrene-acrylonitrile copolymers.

A third essential component for the preparation of artificial aqueous latices according to the present invention is at least one emulsifier capable of forming a stable aqueous emulsion of said polymers. Suitable emulsifiers are of many types and their natures will be immediately apparent to those skilled in the art. Most often, an anionic emulsifier or a mixture thereof with a non-ionic emulsifier is employed. Examples of such emulsifiers are alkali metal $C_{10-25}$ alkyl sulfates and $C_{10-25}$ alkanols, respectively.

Finally, the invention requires a compatibilizing amount of a copolymer of the polymers forming the aqueous artificial latex. Many polymer mixtures which include copolymers are known in the art. For example, ROYALTUF RT 372 of Uniroyal Chemical is a mixture of approximately equal weights of SAN and EPDM of which about 33% comprises SAN/EPDM copolymer.

In the method of this invention, an artificial latex of the two incompatible polymers is formed in the presence of the emulsifier and copolymer. Conventional methods for preparation of the artificial latex may be employed. These typically involve dissolution of the polymers in one or more substantially volatile, water-immiscible organic liquids such as toluene, methylene chloride, chloroform, hexane or the like, followed by dispersion of the resulting solution(s) in water with effective agitation, typically ultrasonic (hereinafter sometimes "sonication"). Dispersion is ordinarily carried out at temperatures in the range of about 15°–40° C., most often room temperature (about 25° C.). The organic liquid(s) is then removed by evaporation, typically under reduced pressure.

The proportions of the previously described constituents employed in the method of the invention are not particularly critical. The weight ratios of the two polymers will most often be in the range of about 0.3–3.0:1 and preferably about 0.4–1.5:1. The emulsifier(s) is usually present in the aqueous medium in a concentration in the range of about 0.005–0.1M.

Copolymer proportions, based on the total weight of polymers in the latex, are likewise not critical provided said proportion is sufficient to compatibilize the two polymers in the aqueous latex. Compatibilizing amounts can readily be determined by simple experimentation. Most often, the copolymer is present in the amount of about 5–20% by weight of total polymers.

An important question raised with respect to the present invention, of course, is which polymer will form the core and which the shell under the conditions of the invention. The parameters affecting this are the surface and interfacial tensions of the two polymers and the aqueous medium in which they are emulsified, and the spreading coefficients of the two polymers on each other, all of which are mathematically related.

As described in Wu, *Polymer Interface and Adhesion* [New York: Marcel Dekker, Inc., 1982], page 96, the interfacial tensions of two polymers designated a and b ($\gamma_{ab}$) is related to the surface tensions of the two polymers ($\gamma_a$ and $\gamma_b$, respectively) by the following equation:

$$\gamma_{ab} \leq \gamma_a - \gamma_b \quad (I)$$

The spreading coefficient of polymer b on polymer a ($\lambda_{ba}$), in a system in which the two polymers are dispersed in medium c, is defined as follows, as noted in Hobbs et al., *Polymer*, 29, 1598–1602 (1988):

$$\lambda_{ba} = \gamma_{ac} - \gamma_{bc} - \gamma_{ab} \quad (II)$$

However, the $\gamma$ values in equation II are the absolute arguments of the values of the same parameter in equation I.

A core-shell morphology is possible if either $\lambda_{ab}$ or $\lambda_{ba}$ is positive. The polymer forming the shell will be the one having the higher spreading coefficient with respect to the other, in the aqueous system employed. From equation II, in which $\gamma_{ab}$ (i.e., the interfacial tension between the polymers) will be the same regardless of which polymer is the core and which the shell, it is apparent that the polymer forming the shell will be the one having the lower interfacial tension with respect to the aqueous medium.

It is also necessary, in order to form particles having core-shell morphology with polymer a forming the core and polymer b the shell, for $\gamma_{ab}$ to be lower than $\gamma_{ac}$ (the interfacial tension between the shell-forming polymer and the aqueous medium). Otherwise, particles of hemispherical morphology will form (if $\lambda_{ab}$ and $\lambda_{ba}$ are both negative) or the core and shell polymers will be reversed. The effect of the presence of copolymer is to reduce the value of $\gamma_{ab}$, thus increasing the value of the relevant $\lambda$.

It is seldom possible, however, to determine on a theoretical basis the values of $\gamma_{ac}$ and $\gamma_{bc}$ for a system in which the continuous phase is water containing a specific emulsifier or combination of emulsifiers. Therefore, it is usually necessary to resort to experimentation to determine which polymer will form the shell in accordance with the present invention. For the previously mentioned combination of long-chain alkanols and alkali metal long-chain alkyl sulfates, the spreading coefficient is higher for the EPDM polymer and so it forms a shell on the SAN copolymer.

The products formed by the method of this invention are stable artificial latices in core-shell form. Previous examples of such latices in which the shell is an olefin polymer or EPDM terpolymer are not believed to be previously known. Accordingly, another aspect of the invention is stable aqueous latices comprising copolymer particles with a core comprising structural units derived from at least one core monomer selected from the group consisting of alkenylaromatic and acrylic compounds; a shell grafted onto and substantially encapsulating said core and comprising structural units derived from at least one aliphatic olefin as a first shell monomer and, optionally, at least one non-conjugated diene as a second shell monomer; and a compatibilizing amount of a copolymer of said core monomer or monomers and said shell monomer or monomers.

The invention is illustrated by an example in which the polymers employed were a commercially available styrene-acrylonitrile copolymer (SAN), a commercially available ethylene-propylene-norbornadiene terpolymer (EPDM) containing about 83 mole percent ethylene units and having an average of 5.4 olefinic carbon atoms (in the norbornadiene units) per 1000 carbon atoms, and a commercially available SAN-EPDM composition containing about 33% graft copolymer (all parts and percentages being by weight unless otherwise indicated) with the remainder being a simple blend.

A mixture of equal parts of the three polymers (containing about 11% copolymer) was dissolved at about 80° C. in a mixture of equal parts of chloroform and toluene, with stirring. The polymer solution was slowly poured into an aqueous solution 0.03M in cetyl alcohol and 0.01M in sodium dodecyl sulfate, with simultaneous sonication. The total volume of the aqueous-organic system was about 70 ml. The solvents were removed by rotary evaporation at 40° C. under reduced pressure, yielding the desired artificial latex.

The latex was examined by transmission electronic microscopy using the following technique. One drop of the latex was diluted in 1 ml. of distilled, deionized water and an equal volume of a 2% aqueous solution of uranyl acetate was added. One drop of the diluted solution was placed on a sample grid, whereupon excess liquid was withdrawn and the sample was examined by cold stage transmission electron microscopy. Distinct latex particles were observed but particle morphology could not be distinguished. The sample grid was then stained for five minutes with ruthenium tetroxide vapor and reexamined, whereupon distinct latex particles having a dark SAN core and a lighter EPDM shell were observed. The average particle size, as observed visually in the electron micrograph, was about 0.3 micron.

A control experiment was conducted under identical conditions, except that a mixture of 50% each of SAN and EPDM was employed with no copolymer. The transmission electron micrograph showed the presence predominantly of particles with a hemispherical portion of each polymer. No core-shell particle morphology was observed.

The latices prepared by the method of this invention are useful in the same ways as previously known artificial latices. They may have advantages, however, by reason of the possibility of shell materials not heretofore available; for example, the EPDM's described hereinabove.

What is claimed is:

1. A stable aqueous latex comprising copolymer particles with a core consisting of styrene and acrylonitrile structural units, a shell grafted onto and substantially encapsulating said core and comprising structural units derived from at least one aliphatic olefin as a first shell monomer and, optionally, at least one non-conjugated diene as a second shell monomer; and a compatibilizing amount of a copolymer of said core monomers and said shell monomer or monomers.

2. A composition according to claim 1 wherein the shell monomers are ethylene and propylene.

3. A composition according to claim 1 wherein the shell monomers are ethylene, propylene and a non-conjugated diene.

4. A method for preparing a core-shell copolymer latex which comprises forming an aqueous artificial latex from two previously formed, otherwise incompatible polymers in the presence of an effective amount of at least one emulsifier therefor and of a compatibilizing amount of a previously formed copolymer of said polymers, wherein one of the polymers is an ethylene-propylene copolymer and the other is a styrene-acrylonitrile copolymer.

5. A method according to claim 4 wherein the emulsifier is an anionic emulsifier or a mixture thereof with a non-ionic emulsifier.

6. A method according to claim 5 wherein the emulsifier is a mixture of alkali metal $C_{10-25}$ alkyl sulfates and $C_{10-25}$ alkanols.

7. A method according to claim 5 wherein the emulsifier concentration in the aqueous medium of the latex is in the range of about 0.005–0.1M.

8. A method according to claim 5 wherein the copolymer is present in the amount of about 5–20% by weight of total polymers.

9. A method according to claim 4 wherein the ethylene-propylene copolymer also contains units derived from a non-conjugated diene.

10. A method according to claim 9 wherein the ethylene-propylene-diene copolymer is the shell polymer and the styrene-acrylonitrile copolymer is the core polymer.

* * * * *